United States Patent
Kim

(10) Patent No.: US 6,666,301 B2
(45) Date of Patent: Dec. 23, 2003

(54) OIL SUPPLY APPARATUS FOR HERMETIC COMPRESSOR

(75) Inventor: Jong-Hyuk Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 10/144,790

(22) Filed: May 15, 2002

(65) Prior Publication Data

US 2002/0170779 A1 Nov. 21, 2002

(30) Foreign Application Priority Data

May 18, 2001 (KR) ........................................ 2001-27388

(51) Int. Cl.[7] ................................................. F01M 1/00
(52) U.S. Cl. ........................................ 184/6.16; 415/88
(58) Field of Search ................ 184/6.16, 6.18; 415/88

(56) References Cited

U.S. PATENT DOCUMENTS

| | | | |
|---|---|---|---|
| 6,364,059 B1 * | 4/2002 | Wellton Persson | 184/6.16 |
| 6,527,086 B2 * | 3/2003 | Oh | 184/6.16 |
| 2002/0170778 A1 * | 11/2002 | Kim | 184/6.16 |

* cited by examiner

*Primary Examiner*—David Fenstermacher
(74) *Attorney, Agent, or Firm*—Fleshner & Kim, LLP

(57) ABSTRACT

An oil supply apparatus for a hermetic compressor includes: a crankshaft coupled with a rotor of a motor so as to revolve together and having an oil flow path inside, a sleeve connected to a lower part of the crankshaft so as to revolve together with the crankshaft 107 in one body, a sucking member arranged to maintain a uniform interval with an inner circumference face of the sleeve so as to revolve in a direction opposite to that of the sleeve to carry out a suction of an oil, and a rotating force transferring means for supporting the sucking member so that the sucking member revolves together with the sleeve and receiving a rotating force of the sleeve so as to revolve the sucking member in a direction opposite to a revolving direction of the sleeve. The relative revolution speed between the sleeve and sucking member increases so as to increase the oil supply to the sliding and frictional parts, thereby enabling to improve a lubrication performance of the compressor. When the compressor generates vibration, the sucking member and sleeve vibrate with the same amplitude so as to maintain uniformly the gap between the sleeve and sucking member. Therefore, the present invention enables to improve a reliance of the oil supply.

12 Claims, 4 Drawing Sheets

OIL SUPPLY APPARATUS FOR HERMETIC COMPRESSOR

BACKGROUND OF THE INVENTION

1. Field of the Invention

The present invention relates to an oil supply apparatus for a hermetic compressor, and more particularly, to an oil supplying apparatus for a hermetic compressor that is capable of increasing oil supply quantity and increasing a lubricating performance of oil.

2. Description of the Background Art

Generally, a hermetic compressor as an apparatus for compressing a fluid to supply is mainly applied to a cooling system such as a refrigerator, an air conditioner, or the like.

FIG. 1 illustrates a cross-sectional view of a hermetic compressor according to a related art.

Referring to FIG. 1, a hermetic compressor according to a related art includes a hermetic casing 1 providing a hermetic space inside, a motor 3 installed inside the hermetic casing 1 so as to provide a driving power, a compression unit 30 carrying out a compression of a fluid by the driving power of the motor 3, and a oil supply apparatus 20 supplying an inside of the hermetic casing 1 with an oil so as to perform lubrication and cooling.

The motor 3 includes a stator 4 wound with a exciting coil and a rotor 5 made of a permanent magnet, thereby generating a rotating force by an electromagnetic reciprocal reaction between the stator 4 and rotor 5.

The compression unit 30 includes a crankshaft 7 connected to the motor 3 to rotate and having an eccentric part at an upper part, a connecting rod 8 transferring a rotating force generated from a rotation of the crankshaft 7, a piston 9 connected to the connecting rod 8 to reciprocate so as to carry out a compression of a fluid, a cylinder 6 having the piston 9 reciprocate inside and providing a compression room for compressing the fluid, and a valve assembly 10 arranged at a front side of the cylinder 6 so as to open/close the compressed fluid.

The oil supply apparatus 20 includes an oil flow path 12 formed inside the crankshaft 7 in a length direction so as to supply sliding and frictional parts inside the compressor with the oil, a sleeve 11 coupled with a lower part of the crankshaft 7 so as to rotate together with the crankshaft 7, a sucking member 13 arranged so as to maintain a predetermined gap with an inner circumference face of the sleeve 11 and sucking the oil through the gap when the sleeve 11 rotates so as to supply the oil flow path 12 with the sucked oil, and a support bracket 14 supporting a state that the sucking member 13 is inserted in the inner circumference face of the sleeve 11.

The sucking member 13, of which lower part is supported by the support bracket 14, is arranged so as to maintain a predetermined gap with an outer circumference face of the sleeve 11 as well as stop relatively inside the sleeve 11 sleeve 11 rotation together with the crankshaft 7. And, a spiral oil flow path is formed at an outer circumference face of the sucking member 13 so as to suck the oil along the spiral oil flow path when the sleeve 11 rotates.

The bracket 14 has a predetermined elasticity. A central part of the bracket 14 is fixed to the lower part of the sucking member 13 so as to support the sucking member 13 not to rotate. And, both extending parts of the bracket 14 from the central part are fixed to the lower part of the stator 4.

Operation of the above-constructed oil supply apparatus in the hermetic compressor is explained as follows.

First, once the motor 3 rotates, the crankshaft 7 rotates to transfer a dynamic power to the compression unit 30 so as to compress the fluid. When the crankshaft 7 rotates by the rotation of the motor 3, the sleeve 11 rotates while the sucking member 13 supported by the bracket 14 maintains a static state inside the sleeve 11. Hence, the oil is sucked in along the spiral oil flow path at the outer circumference face of the sucking member 13 by the relative rotation of the sleeve 11 for the sucking member 13.

The oil having sucked in through the sucking member 13 is carried to an upper part through the oil flow path 12 of the crankshaft 7 as well as sliding and exothermic parts of the hermetic casing 1 so as to carry out lubrication and heat dissipation.

Even if the state that the sucking member 13 is fixed to the bracket in the above-constructed hermetic compressor according to the related art, the sleeve 111 rotates together with the crankshaft 7. When a vibration occurs in driving the compressor, the sucking member 13 is fixed but the sleeve 11 shakes due to the vibration of the compressor. Hence, it is difficult to maintain precisely the gap between the outer circumference face of the sucking member 13 and the inner face of the sleeve 11, whereby the suction power of the oil is reduced. Thus, the frictional and sliding parts in the compressor fail to be supplied with the oil sufficiently. Hence, abrasion and damage are caused on the frictional and sliding parts so as to degrade a performance of the hermetic compressor.

Moreover, in the assembly process, the bracket 14 supports the lower part of the sucking member 13 having been inserted in the sleeve 11, and then both ends of the support bracket 14 should be fixed to the stator 5. Therefore, the assembly process becomes more complicated.

SUMMARY OF THE INVENTION

Accordingly, the present invention is directed to an oil supply apparatus in a hermetic compressor that substantially obviates one or more problems due to limitations and disadvantages of the related art.

An object of the present invention is to provide an oil supply apparatus in a hermetic compressor enabling to increase an oil supply performance by maintaining a precise gap between a sucking member and a sleeve in a manner that amplitudes of the sucking member and sleeve are kept equal to each other by having the sucking member of the compressor supported by the sleeve when the hermetic compressor generates vibration.

Another object of the present invention is to provide an oil supply apparatus in a hermetic compressor enabling to improve a lubrication performance, and further, a compressor performance by increasing an oil quantity supplied to frictional and sliding parts by making a sucking member revolve in a reverse direction when a sleeve rotates in a forward direction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an oil supply apparatus in a hermetic compressor according to the present invention includes a crankshaft coupled with a rotor of a motor so as to revolve together and having an oil flow path inside, a sleeve connected to a lower part of the crankshaft so as to revolve together with the crankshaft 107 in one body, a sucking member arranged to maintain a uniform interval with an inner circumference face of the sleeve so as to revolve in a direction opposite to that of the sleeve to carry out a suction of an oil, and a rotating force transferring means for supporting the sucking member so that the sucking member revolves together with the sleeve and receiving a rotating force of the sleeve so as to revolve the sucking member in a direction opposite to a revolving direction of the sleeve.

Preferably, the rotating force transferring means includes a sun gear connected to the sleeve so as to rotate together with the sleeve and a planetary gear geared between the sun gear and the sucking member in teeth so as to revolve along an outer circumference face of the sun gear as well as rotate and making the sucking member revolve in a direction opposite to a rotational direction of the sun gear.

More preferably, a hanger is fixed to an upper inner circumference face of the sleeve so as to connect the sun gear to the sleeve. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
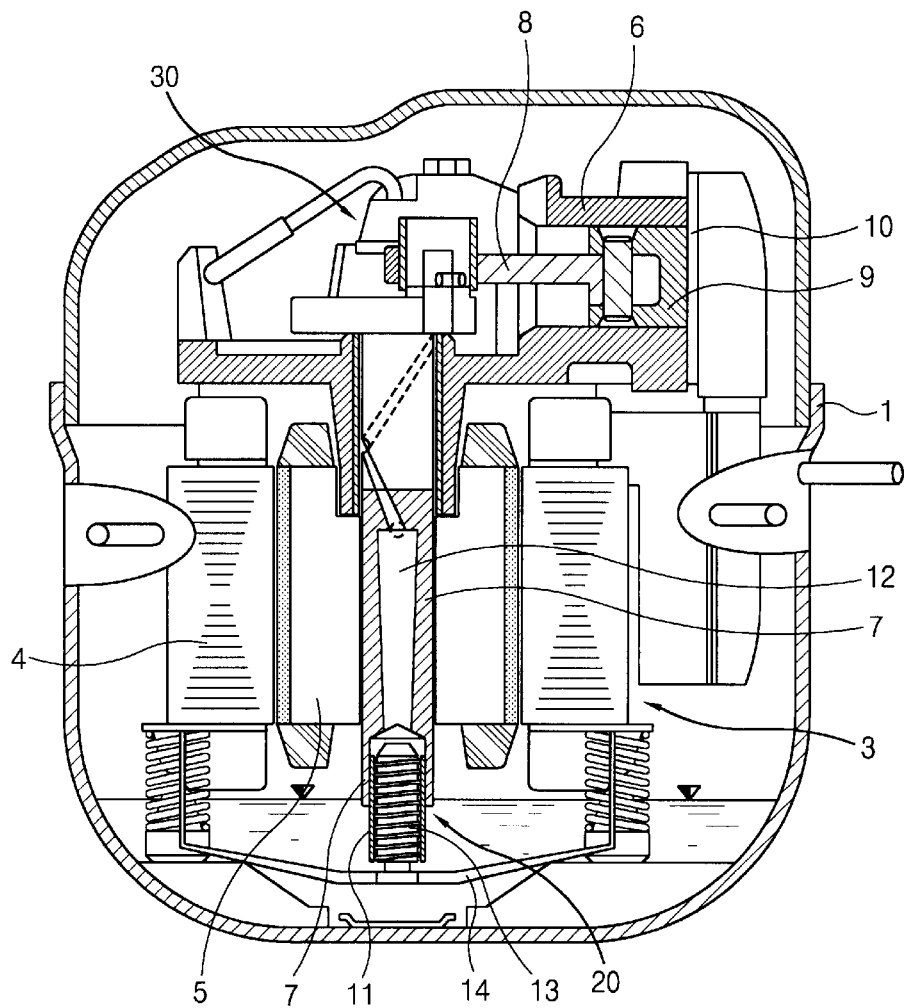
FIG. 1 illustrates a cross-sectional view of a hermetic compressor according to a related art.
Figure 2:
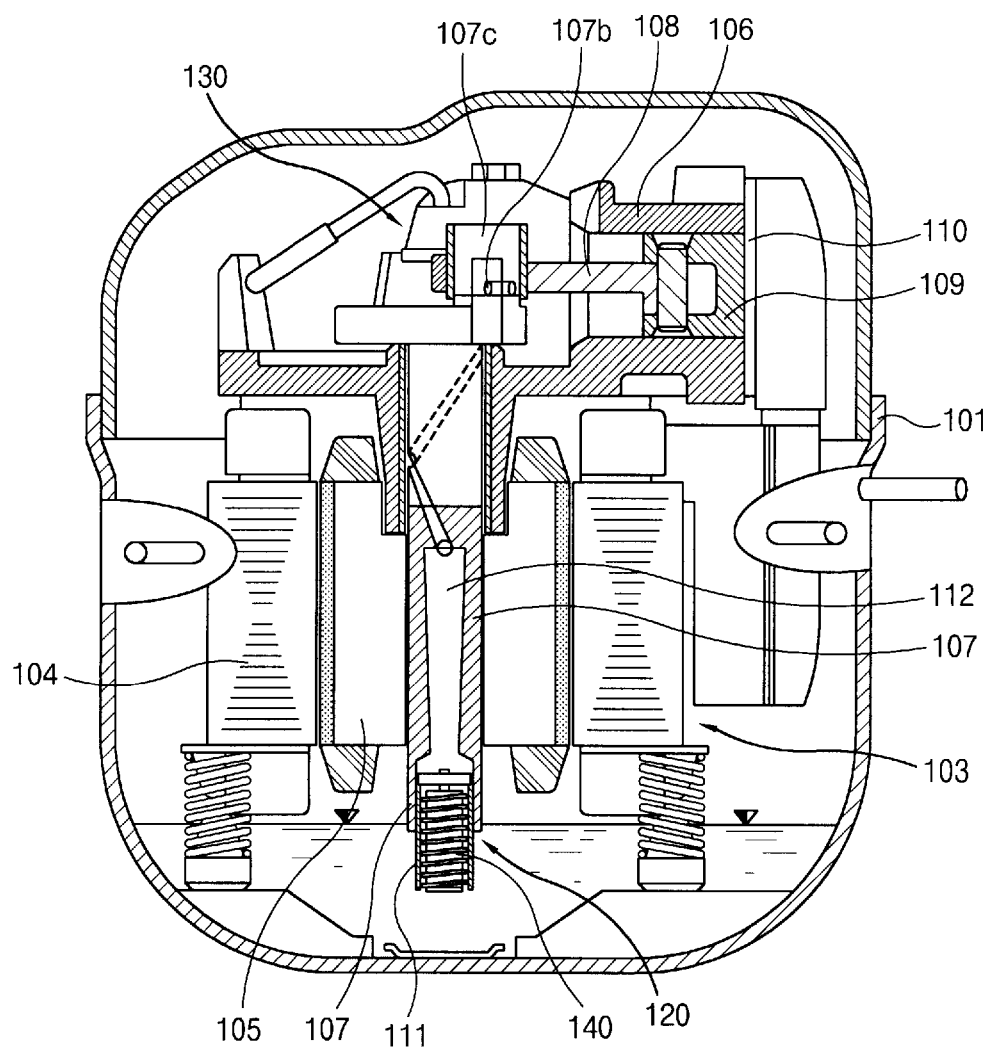
FIG. 2 illustrates a cross-sectional view of a hermetic compressor according to the present invention.
Figure 3:
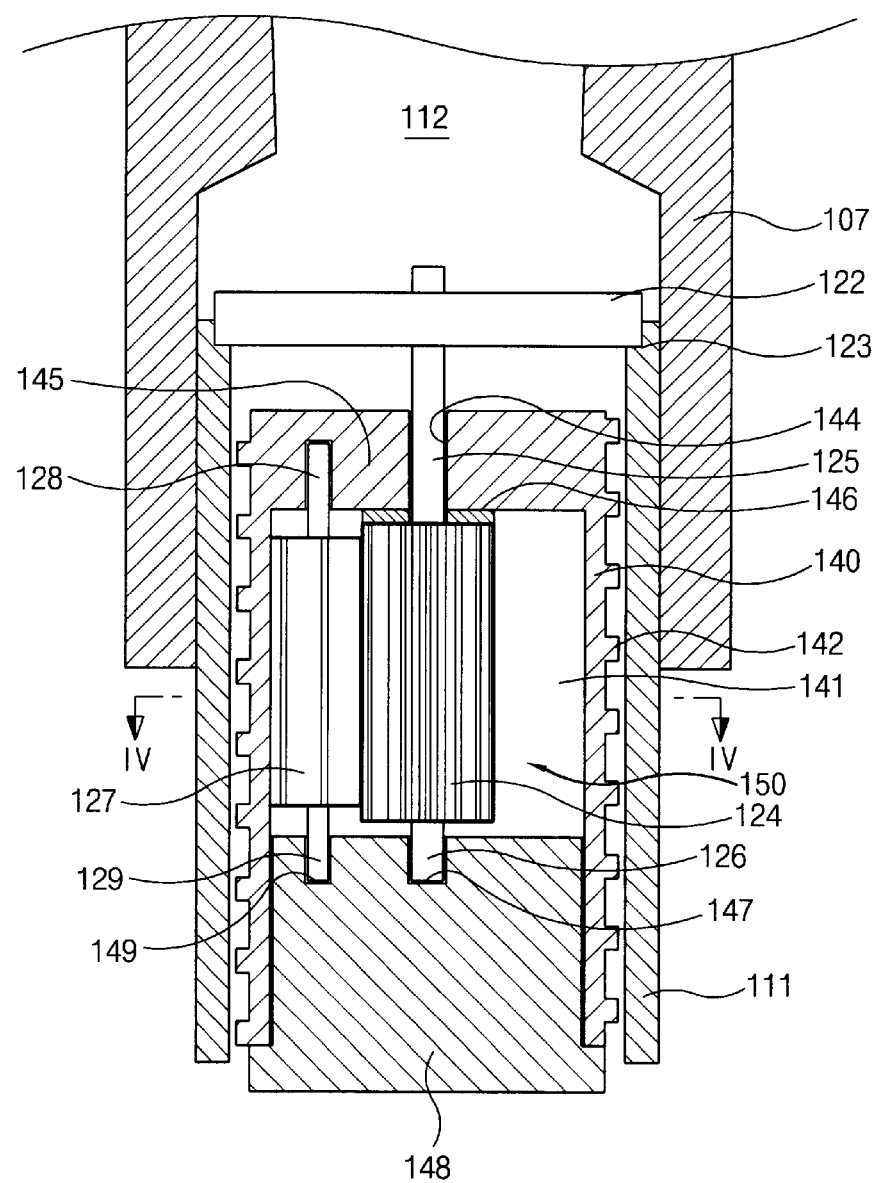
FIG. 3 illustrates a partially magnified view of an oil supply apparatus in FIG. 2.
Figure 4:
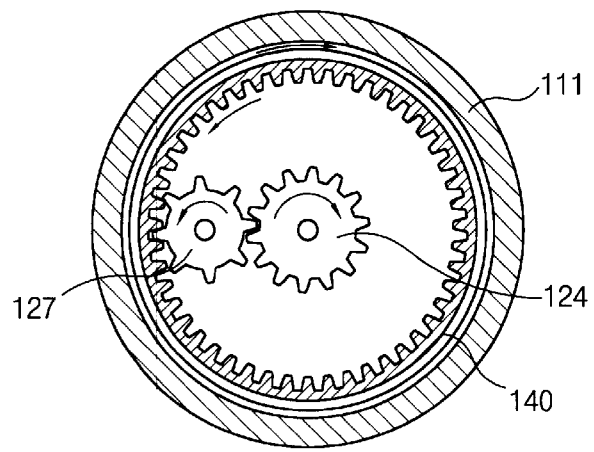
FIG. 4 illustrates a cross-sectional view along a cutting line IV—IV in FIG. 3.

FIG. 2 illustrates a cross-sectional view of a hermetic compressor according to the present invention, FIG. 3 illustrates a partially magnified view of an oil supply apparatus in FIG. 2, and FIG. 4 illustrates a cross-sectional view along a cutting line IV—IV in FIG. 3.

Referring to FIG. 2 and FIG. 3, a hermetic compressor according to the present invention includes a hermetic casing 101 providing a hermetic space inside, a motor 103 installed inside the hermetic casing 101 so as to provide a driving power, a compression unit 130 carrying out a compression of a fluid by the driving power of the motor 103, and a oil supply apparatus 120 supplying an inside of the hermetic casing 101 with an oil so as to perform lubrication and cooling.

The motor 103 includes a stator 104 wound with a exciting coil and a rotor 105 made of a permanent magnet, thereby generating a rotating force by an electromagnetic reciprocal reaction between the stator 104 and rotor 105.

The compression unit 130 includes a crankshaft 107 connected to the rotor 105 of the motor 103 to rotate and having an eccentric part 107c at an upper part, an eccentric pin 107b formed at the eccentric part 107c of the crankshaft 107, a connecting rod 108 connected to the eccentric pin 107b so as to transfer a rotating force of the crankshaft 107, a piston 109 connected to the connecting rod 108 to reciprocate so as to carry out a compression of the fluid, a cylinder 106 having the piston 109 reciprocate inside and providing a compression room, and a valve assembly 110 arranged at a front side of the cylinder 106 so as to open/close the compressed fluid.

The oil supply apparatus 120 includes an oil flow path 112 formed inside the crankshaft 107 in a length direction so as to supply sliding and frictional parts inside the compressor with the oil, a sleeve 111 coupled with a lower part of the crankshaft 107 so as to rotate together with the crankshaft 107, a sucking member 140 arranged so as to maintain a predetermined gap with an inner circumference face of the sleeve 111 and sucking the oil by a reciprocal operation with the sleeve 111, and a rotating force transferring means for 150 supporting the sucking member 140 and revolving the sucking member 140 in a direction opposite to a revolving direction of the sleeve 111 by receiving a rotating force of the sleeve 111.

The sleeve 111 is cylindrical and connected to the lower part of the crankshaft 107 to revolve together. An end portion of the sleeve 111 is dipped in the oil filling the lower part of the hermetic casing 101. The sucking member 140 is arranged at an inner circumference face of the sleeve 111 so as to maintain a uniform gap with the sleeve 111. A spiral oil flow path 142 is formed at an outer circumference face of the sucking member 140 so as to provide a suction force sucking the oil in an upper direction when the sleeve 111 revolves. And, the rotating force transferring means 150 is installed at an inner circumference face of the sucking member 140 so as to revolve the sucking member 140 in a reverse direction by receiving the rotating force of the sleeve 111.

The rotating force transferring means 150 includes a hanger 122 connected to an inner upper end of the sleeve 111 in a crossing direction, a sun gear 124 connected to the hanger 122 and arranged at an inner center of the sucking member 140 in a length direction so as to revolve in the same direction of the sleeve 111, a planetary gear geared with the sun gear 124 in tooth so as to revolve along an outer circumference face of the sun gear 124 as well as rotate, and an inner contact gear part 141formed at an inner circumference face of the sucking member 140 so as to be in gear with the planetary gear 127. And, a support member 148 is fixed to a lower inner face of the sucking member 140 so as to support the sun and planetary gears 124 and 127 to revolve.

The hanger 122 is a bar type fixed to fixing grooves 123 formed at both upper ends of the sleeve 111. The sun gear 124 is fixed to a center of the hanger 122 so as to rotate round a revolving center shared with the sleeve 111. The sun gear 124 is placed at an inner center of the sucking member 140 in a length direction. An upper rotational shaft 125 extends from the sun gear 124 so as to be fixed to the hanger 122, and a lower rotational shaft 125 extends from the sun gear 124 so as to be supported by the support member 148 to rotate. And, the upper rotational shaft 125 penetrates a penetrating hole 144 at an upper center of the sucking member 140 so as to be fixed to a center of the hanger 122.

In this case, the sucking member 140 is supported at one side of the sun gear 124 to revolve. Namely, the sucking member 140 includes a support part 145 having a predetermined width in a direction of an upper circumference where the penetrating hole 144 is formed. And, a lower circumference face of the support part 145 is supported by an upper circumference face of the sun gear 124 to which the upper rotational shaft 125 is connected so as to revolve. Besides, a bearing 146 is inserted between an upper side of the sun gear 124 and the support part 145 so as to support the sucking member 140 to revolve.

Preferably, the bearing 146 is a washer type thrust bearing.

The planetary gear 127 is geared between the sun gear 124 and the inner contact gear part 141 of the sucking member 140. And, upper and lower rotational shafts 128 and 129 are connected to upper and lower sides of the planetary gear 127, respectively.

The upper rotational shaft 128 extending from the upper side of the planetary gear 127 is supported by a hinge recess 143 at an eccentric location of the support part 145 of the sucking member 140 so as to rotate. And, the lower rotational shaft 129 extending from the lower side of the planetary gear 127 is supported by the support member 148 so as to rotate.

When the sun 124 gear 124 rotates in one direction, such a planetary gear 127 revolves and rotates in the same direction as well as revolves the sucking member 140 in a direction opposite to the rotational direction of the sun gear 124.

The support member 148 is a disc type inserted to be fixed to a lower inner circumference face of the sucking member 140. A hinge recess 147 is formed at a center of the support member 148 so as to support the lower rotational shaft 128 of the sun gear 124 to rotate, and another hinge recess 149 is formed at a place eccentric from the center of the support member 148 so as to support the lower rotational shaft 129 of the planetary gear 127 to rotate. Operation of the above-constructed hermetic compressor according to the present invention is explained as follows.

Referring to FIG. 2 to FIG. 4, once the motor 103 is actuated, the crankshaft 107 connected to the motor 103 starts to revolve. And, the rotating force of the crankshaft 107 is transferred to the connecting rod 108 through the eccentric pin 107b. The power transferred to the connecting rod 108 reciprocates the piston 109 inside the cylinder 106.

Therefore, the operation of the piston 109 compresses to blow the fluid flowing in the cylinder 106 externally.

And, the rotating force of the crankshaft 107 is transferred to drive to the oil supply apparatus 120 so as to carry out the lubrication of the sliding and frictional parts inside the compressor.

Specifically, once the crankshaft 107 revolves by the rotation of the motor 103, the sleeve 111 coupled with the crankshaft 107 rotates as well so as to revolve the sun gear 124 through the hanger 122 fixed to the sleeve 111. Subsequently, the planetary gear 127 geared with the sun gear 124 revolves round the outer circumference face of the sun gear 124 as well as rotates by the rotation of the sun gear 124, and then the sucking member 140 geared with the planetary gear 127 comes into revolution by the revolution and rotation of the planetary gear 127.

Namely, once the sleeve 111 revolves in one direction, as shown in FIG. 4, the sun gear rotates 124 in the same direction while the planetary gear 127 geared with the sun gear 124 revolves in a direction opposite to the rotational direction of the sun gear 124. Therefore, the sucking member 140 comes into revolution in a direction opposite to the revolving direction of the sleeve 111.

And, the oil is sucked along the spiral oil flow path 142 at the outer circumference face of the sucking member 140 by the reverse-directional revolution of the sucking member 140 against the sleeve 111.

Thereafter, the oil sucked in through the sucking member 140 is carried to the upper part through the oil flow path 112 so as to be transferred to the sliding and exothermic parts, thereby carrying out the lubrication and heat dissipation.

In this case, the sucking member 140 maintains the state that the support part 145 at the top is supported by the upper side of the sun gear 124 so as to revolve.

As mentioned in detail in the above description of the hermetic compressor according to the present invention, the rotating force transferring means transfers a rotating force revolving in a direction opposite to that of the sucking member so that the sleeve and the sucking means revolve in opposite directions, respectively. Therefore, the relative revolution speed between the sleeve and sucking member increases so as to increase the oil supply to the sliding and frictional parts. Accordingly, the present invention enables to improve a performance of the compressor.

Moreover, in the hermetic compressor according to the present invention, the support part is formed at the upper part of the sucking member. And the support part is supported by the upper side of the sun gear fixed to the sleeve by the hanger so as to revolve. When the compressor generates vibration, the sucking member and sleeve vibrate with the same amplitude so as to maintain uniformly the gap between the sleeve and sucking member. Therefore, the present invention enables to improve a reliance of the oil supply.

Furthermore, in the hermetic compressor according to the present invention, the sleeve, sucking member, and rotating force transferring means are built in one body so as to construct a single assembly. Therefore, the present invention installs the single assembly in the compressor, thereby enabling to improve an assembling productivity of the compressor.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An oil supply apparatus in a hermetic compressor, comprising:

a crankshaft coupled with a rotor of a motor so as to revolve together and having an oil flow path inside;

a sleeve connected to a lower part of the crankshaft so as to revolve together with the crankshaft in one body;

a sucking member arranged to maintain a uniform interval with an inner circumference face of the sleeve so as to revolve in a direction opposite to that of the sleeve to carry out a suction of an oil; and a rotating force transferring means for supporting the sucking member so that the sucking member revolves together with the sleeve and receiving a rotating force of the sleeve so as to revolve the sucking member in a direction opposite to a revolving direction of the sleeve.

2. The oil supply apparatus of claim 1, wherein a spiral oil flow path is formed at an outer circumference face of the sucking member so as to carry out the suction of the oil.

3. The oil supply apparatus of claim 1, the rotating force transferring means comprising:

a sun gear connected to the sleeve so as to rotate together with the sleeve; and a planetary gear geared between the sun gear and the sucking member in teeth so as to revolve along an outer circumference face of the sun gear as well as rotate and making the sucking member revolve in a direction opposite to a rotational direction of the sun gear.

4. The oil supply apparatus of claim 3, wherein a hanger is fixed to an upper inner circumference face of the sleeve so as to connect the sun gear to the sleeve.

5. The oil supply apparatus of claim 4, wherein the hanger is a bar type and wherein both ends of the hanger are fixed to fixing grooves formed at both sides of an inner circumference face of the sleeve, respectively and the sun gear is installed at a center of the hanger.

6. The oil supply apparatus of claim 3, wherein a support member is fixed to a lower inner circumference face of the sucking member so as to support to let the sun and planetary gears to revolve.

7. The oil supply apparatus of claim 6, wherein a hinge recess is formed at a center of the support member so as to make the sun gear rotate and another hinge recess is formed at a portion eccentric from the center of the support member so as to let the planetary gear revolve.

8. The oil supply apparatus of claim 6, wherein the sun gear is arranged at an inner center of the sucking member in a length direction, an upper rotational shaft is formed at an upper part of the sun gear so as to be fixed to a center of the hanger, and a lower rotational shaft is formed at a lower part of the sub gear so as to be inserted in the hinge recess of the support member.

9. The oil supply apparatus of claim 8, wherein an inner contact gear part 141 is formed at the inner circumference face of the sucking member so as to be geared with the planetary gear, a support part is formed at an upper part of the sucking member so as to be supported by an upper side of the sun gear, and a penetrating hole is formed at a center of the support part so as to be penetrated by the upper rotational shaft the sun gear.

10. The oil supply apparatus of claim 9, wherein a bearing is installed between the support part of the sucking member and the upper side of the sun gear so as to let the sucking member revolve.

11. The oil supply apparatus of claim 10, wherein the bearing is a thrust washer type bearing.

12. The oil supply apparatus of claim 3, wherein the planetary gear is geared between the sun gear and an inner contact gear part of the sucking member so as to rotate to revolve in a circumferential direction of the sun gear, an upper rotational shaft extends from an upper part of the planetary gear so as to be inserted in a hinge recess formed at one side of the support part of the sucking member, and a lower rotational shaft extends from the lower part of the planetary gear so as to be inserted in another hinge recess of the support member.

* * * * *